US00RE37629E

(19) United States
(12) Reissued Patent
Wilkins, Jr.

(10) Patent Number: US RE37,629 E
(45) Date of Reissued Patent: Apr. 9, 2002

(54) ENGINE FUELS

(76) Inventor: Joe S. Wilkins, Jr., 7700 Seawall Blvd., #403, Galveston, TX (US) 77551

(21) Appl. No.: 09/591,606

(22) Filed: Jun. 9, 2000

Related U.S. Patent Documents

Reissue of:
(64) Patent No.: 5,575,822
Issued: Nov. 19, 1996
Appl. No.: 08/481,607
Filed: Jun. 7, 1995

U.S. Applications:

(63) Continuation-in-part of application No. 08/238,266, filed on May 4, 1994, now Pat. No. 5,501,713.

(51) Int. Cl.[7] ..... C10L 1/18

(52) U.S. Cl. ..... 44/307; 585/14

(58) Field of Search ..... 585/14; 44/307, 44/308

(56) References Cited

U.S. PATENT DOCUMENTS

| | | | | | |
|---|---|---|---|---|---|
| 1,405,809 | A | * | 2/1922 | Whitaker | 44/307 |
| 1,770,315 | A | * | 7/1930 | Laurent | 44/307 |
| 4,533,487 | A | * | 8/1985 | Jones | 252/170 |
| 4,623,363 | A | * | 11/1986 | Zaweski et al. | 44/307 |
| 4,818,250 | A | * | 4/1989 | Whitworth | 44/307 |
| 4,915,707 | A | * | 4/1990 | Whitworth | 44/307 |
| 5,252,107 | A | * | 10/1993 | Wilkins, Jr. | 44/307 |

OTHER PUBLICATIONS

*Condensed Chemical Dictionary,* 9th Ed., p. 596. date unavailable.*

104 Octane Boost fuel additive (bottle label). No date.*

* cited by examiner

*Primary Examiner*—Jacqueline V. Howard
(74) *Attorney, Agent, or Firm*—Laura G. Barrow

(57) ABSTRACT

Novel engine fuels and engine fuel additives comprising terpenes, aliphatic hydrocarbons, and lower alcohols are disclosed.

50 Claims, No Drawings

ENGINE FUELS

Matter enclosed in heavy brackets [ ] appears in the original patent but forms no part of this reissue specification; matter printed in italics indicates the additions made by reissue.

This is a continuation-in-part of application Ser. No. 08/238,266, filed May 4, 1994, and related to application Ser. No. 08/472,142, filed Jun. 7, 1995 and also a continuation-in-part of application Ser. No. 08/238,266, now U.S. Pat. No. 5,501,713.

BACKGROUND OF INVENTION

1. Field of Invention

The present invention is related to novel engine fuels which are more efficient and environmentally safer than conventional fossil fuels and nitromethane-based fuels. The inventive fuel compositions are suitable for igniting internal combustion engines, specifically 2-cycle, 4-cycle, and diesel engines, as well as jet propulsion engines.

2. Description of Related Art

Presently, race cars and dragsters having 4-cycle internal combustion engines use fuels containing as much as 90 to 95% nitromethane. Similarly, the smaller Hobby car and airplane engines (2-cycle and 4-cycle) use fuels containing from 5% to 40% nitromethane, over 50% methanol, and from about 18% to about 24% oil. While these fuels possess the necessary high levels of BTU's required to run these engines, nitromethane fuels are very dangerous as well as toxic to the environment. A conventional nitromethane (10%)/methanol (70%)/oil (20%) fuel, for example, has a vapor pressure of 196 mm Hg and thus, is very explosive. These fuels also leave relatively large amounts of liquid raw residue in the exhaust and are environmentally unsafe. In addition, the relatively large percentage of lubricating oil present in the fuel mixture, in particular conventional 2-cycle oils, also contributes to these emissions.

The small utility engines found in lawn and garden equipment such as lawnmowers, weedeaters, chain saws, grass blowers, and grass edgers as well as outboard motors and motorcycles, for example, are typically 2-cycle engines which generally use gasoline fuels containing a petroleum-based 2-cycle lubricating oil as a direct component of the fuel. Gasoline/oil fuels are used as alternatives to nitromethane fuels in the smaller Hobby engines, as well. From an environmental standpoint, the use of a gasoline/oil fuel in these 2-cycle engines has a more direct effect in producing emission pollutants than gasoline-only fuels used in most 4-cycle engines, primarily due to the additional oil component present in the fuel. [There are also special 4-cycle engines that, like 2-cycle engines, do not have a crankcase and thus require that a lubricating oil be directly added to the fuel.] For example, it was reported that many small utility engines produce up to 50 times the pollution of trucks per horsepower hour; that mowing the lawn for half an hour can produce as much smog as driving a new car 172 miles; and that using a chain saw for two hours gives off as many hydrocarbons as a car driven from coast-to-coast. [California Air Resources Board, statements in connection with a public hearing December 14, 1990 in San Francisco, Calif., "Small Engine Emissions," *Technology Today,* p.3, March 1991.] Consequently, there is a desire to reduce the amount of emissions produced from these small engines, either by fuel reformulation or the more costly redesign of present engines.

There have been various efforts to replace conventional fossil fuels typically used in 4-cycle internal combustion engines. In U.S. Pat. No. 4,818,250 to Whitworth, for example, a purified limonene fuel is disclosed for ignition of an internal combustion engine. This patent suggests that the limonene processed according to its teachings is a suitable additive for conventional fuels or may be used by itself as an alternative to such fuels. The limonene fuel is purified to remove contaminants and as much water as possible. The fuel is further processed to prevent gum formation, either by dehydrogenation of the limonene itself to remove the double bonds or by the addition of a suitable antioxidant. Since limonene has a relatively high flash point of about 113 to 124° F., depending upon the grade used, it is believed that the fuel described by Whitworth is not capable, by itself, of igniting an engine unless the engine has a high voltage ignition. Large 4-cycle engines present in automobiles and trucks, for example, have high voltage constant electronic ignitions which are sufficient to ignite a fuel having such a high flash point. Conversely, 2-cycle engines generally require fuels having much lower flashpoints.

U.S. Pat. No. 4,818,250 further discloses other alternatives to conventional fuels, including U.S. Pat. No. 4,131,434 to Gonzalez, which is directed to a fuel additive for oil, diesel oil, and gasoline to improve fuel efficiency and reduce resulting air pollutants. Exemplary Gonzalez additives are aromatic and aliphatic hydrocarbon solvents with and without oxygenated functional groups, terpenes, and aromatic nitrogen containing compounds.

U.S. Pat. No. 2,402,863 to Zuidema et al., which is also discussed in the Whitworth patent, is directed to blended gasoline of improved stability and, more particularly, leaded gasoline containing up to about 10% alicyclic olefins which preferably contain a cyclohexane ring. Cyclic olefin is defined as an alicyclic hydrocarbon containing an olefin double bond in the ring (preferably no more than one). The alicyclic olefins are suggested to be available from terpenes or from synthesis such as partial dehydrogenation of naphthenes. A number of individual cyclic olefins are stated as being suitable, including, for example, terpenes such a dilimonene (citene) and $d^{+}1$ limonene (dipentene).

It is therefore desireable to design an alternative fuel that is safer, environmentally cleaner, and as efficient, if not more efficient, than conventional fuels.

SUMMARY OF THE INVENTION

The present invention is related to novel engine fuels useful for the ignition of internal combustion engines, in particular 2-cycle, 4-cycle, and diesel engines, as well as jet propulsion engines. The inventive engine fuels may be used alone as alternatives to conventional engine fuels, or as fuel additives for other conventional fuels such as petroleum-based fuels (i.e. fossil fuels), nitromethane-based fuels, and alcohol-based fuels, for example. In certain aspects of the present invention, the inventive fuel is particularly useful as a replacement for the more dangerous and environmentally hazardous nitromethane fuels used in small Hobby car and airplane 2-cycle and 4-cycle engines and large 4-cycle engines found in race cars, for example. The inventive fuel is also a safer, more efficient, and in most embodiments, an environmentally cleaner fuel than conventional fossil fuels, such as gasoline, used to ignite small 2-cycle and 4-cycle utility engines, such as those used in lawn and garden equipment, outboard motors, and motorcycles, for example, as well as 4-cycle engines also found in some garden equipment and in automobiles and trucks, for example. In particular, particulate emissions are especially reduced since less oil, if any, is present in the inventive fuel to burn.

Certain compositions of the inventive fuel are at least 60% more efficient in terms of gallons per hour (GPH) than conventional 2-cycle and 4-cycle engine fuels and exhibit low flash points and high BTU's (i.e. from about 15,000 to about 18,000 BTU's).

Specifically, the inventive fuels comprise at least one terpene, preferably limonene. Limonene in particular is both a biologically and environmentally safe substance as well as an effective engine fuel. Since limonene also has sufficient lubricating qualities, certain aspects of the inventive fuel require little or no lubricating oil. Satisfactory lubricating oils which may be employed, however, include conventional petroleum-based oils, naturally occurring oils such as castor bean oil, for example, and synthetic oils containing both petroleum-based oils and natural oils.

Because terpenes such as limonene have relatively high flash points, the inventive fuels contain at least one component which has a lower flash point, and thus contributes to lowering the overall flash point of the entire fuel for better ignition. Suitable "flash-point" lowering compounds include alcohols, more preferably alcohols having preferably from one to six carbon atoms, and aliphatic hydrocarbon solvents such as aliphatic petroleum distillates, preferably VM&P Naphtha. Like the terpenes, these components are environmentally cleaner than conventional fossil fuels and nitromethane fuels.

Finally, certain embodiments of the inventive fuel further include a surfactant to improve the blending of the foregoing components and improve the shelf life of the final product.

DETAILED DESCRIPTION OF THE PREFERRED EMBODIMENT

The present invention is directed to fuels for igniting engines, including internal combustion engines such as 2-cycle, 4-cycle, and diesel engines as well as jet propulsion engines. [As already discussed herein, there are also special 4-cycle engines that do not have a crankcase and, like 2-cycle engines, require oil as a direct fuel component. Thus, the preferred inventive fuels suitable for 2-cycle engines are also preferred for these "special" 4-cycle engines.] The characteristics of the inventive fuels include greater efficiency in terms of gallons per hour (GPH), improved safety due to a lower vapor pressure, cleaner burning resulting in fewer emissions and particulates being released into the atmosphere, and cooler burning engines.

The term "inventive fuels" as used herein refers to those fuel compositions which may be used alone as alternatives to conventional fuels (e.g. petroleum-based, nitromethane-based, and alcohol-based fuels) or as fuel additives to be used in combination with other conventional fuels to ignite an engine.

All of the inventive fuels comprise a terpene as one of the components. Terpenes are widely distributed in nature and are present in nearly all living plants. It is generally recognized that the term "terpene" not only applies to isoprene oligomers, but also to their saturated or partially saturated isomers as well as to their derivatives, which are referred to as terpenoids, such as, for example, alcohols, aldehydes, esters, and the like. Terpenes have been widely used as flavor and perfume materials. Common monoterpenes include turpentine and limonene.

The preferred terpene is limonene which is a naturally occurring chemical found in high concentrations in citrus fruits and spices. [For ease of explanation, the present inventive fuel compositions (and fuel additives formulations) will be discussed herein with reference to limonene as the terpene fuel component. However, it is recognized that other suitable terpenes may be used, as well] While d-limonene is the more preferred isomer, 1-limonene may also be used in the present invention (1-limonene is also found in naturally occurring substances such as pine-needle oil, oil of fir, spearmint, and peppermint, for example.) In addition to uses as flavor additives and perfume materials, limonene has been used in household and industrial cleaning products. Limonene is commercially available from Florida Chemical Company, Inc., for example, in three different grades, namely untreated/technical grade, food grade, and lemon-lime grade. The food grade comprises about 97% d-limonene, the untreated/technical grade about 95% d-limonene, and the lemon-lime grade about 70% d-limonene, the balance in all being other terpene hydrocarbons and oxygenated compounds. The technical and food grades of limonene are the most preferred for use in this invention and require no additional purification to remove impurities or water. Depending upon the particular components present and the type of engine for which it is formulated, the inventive fuels preferably comprise from about 5 w/w% to about 50 w/w% limonene, more preferably from about 5 w/w% to about 20 w/w% properties, at least 10 w/w% should be present if the fuel contains no lubricating oil. However, if the fuel comprises lower concentrations of limonene of less than about 10 w/w%, the fuel should further comprise a sufficient amount of at least one lubricating oil, as discussed further below.

Limonene has a flash-point ranging from about 113° F. to about 124° F., depending on the purity of the material. Due to its high flash point, limonene alone will not easily ignite an engine unless subjected to a very high temperature spark resulting from high voltage ignitions which are commonly present in large 4-cycle. The inventive fuels, however, should preferably have flash points ranging from about 45° F. to about 75° F. in order to ignite the engine.

A preferred flash-point lowering compound is an aliphatic hydrocarbon solvent, more preferably an aliphatic petroleum distillate compound. The most preferred aliphatic petroleum distillate is VM&P Naphtha, which has a flash point of about 50° F., emits relatively few volatile organic compounds (VOC) when burned, blends well with limonene and the other components of the fuel, and is relatively inexpensive. Other aliphatic hydrocarbon solvents may also be used, preferably those having flash points ranging from about 45° F. to about 75° F. in order to ignite the engine. VM&P Naphtha is particularly preferred in inventive fuel compositions designed for use in Hobby engines and 2-cycle and 4-cycle motorcycle engines for which a fuel having high BTU's is more desirable (VM&P Naphtha has about 22,400 BTU's). The concentration of aliphatic petroleum distillates may range from about 1 w/w% to about 90 w/w%, with the more preferred ranges depending upon the type of engine used, as discussed further below.

Another suitable flash-point lowering compound is alcohol, preferably a lower alcohol having from one carbon atom to about six carbon atoms. At least one alcohol may be used in lieu of, or in addition to, the aliphatic petroleum distillate such as VM&P Naphtha, for example. Illustrative of suitable alcohols are methanol, ethanol, n-propanol, isopropanol, n-butyl alcohol, isobutyl alcohol, sec-butyl alcohol, n-pentyl alcohol, isopentyl alcohol, tert-pentyl alcohol, methyl amyl alcohol and the like. Methanol, ethanol, and isopropanol are the more preferred alcohols, with methanol being the most preferred of the three, primarily due to cost. The flash points of alcohols range from about 53° F. to about 103° F., depending upon which alcohol is used. Methanol, ethanol, and isopropanol, for example, have flash points of about 54°, about 53° F. and from about 53 to about 63° F., respectively, which are sufficient to ignite an engine. Again, depending upon the other components present and the type of engine used, the preferred concentration ranges of alcohol present in the inventive fuel will vary from 0 to about 90 w/w%, as discussed further below.

For use in the larger two-cycle utility engines, the inventive fuels require comparatively little if any lubricating oil. The amount of oil present in the inventive fuels thus range from 0 w/w% to about 13 w/w%, preferably from about 0.50 w/w% to about 7 w/w%, with the most preferred concentrations depending upon the amount of limonene present and the type of engine used, as discussed further below.

Because of the reduced amounts of oil used, less particulates are released due to the burning of the oil. This is particularly true for 2-cycle (and "special" 4-cycle) engines, which have no crankcases and thus require that the lubricating oil be incorporated directly into the fuel mixture. Suitable lubricating oils include conventional petroleum-based oils as well as natural oils such as AA STANDARD castor bean oil produced by CasChem, Inc., for example. Castor oil has certain advantages over petroleum-based oils. First, castor oil retains its lubricity better at high temperatures than do petroleum-based oils. Second, castor oil has a higher film strength than do the petroleum-based oils, and thus will not degrade as easily, in particular at high temperatures. Castor oil also lubricates longer than most petroleum-based oils. These properties of castor oil are particularly desirable when used in Hobby engines running at about 13,000 RPM's and other engines running at high RPM's, which consequently generate large amounts of heat. Another suitable lubricating oil is a synthetic lubricating oil combining castor oil and petroleum-based oils, such as, for example, Klotz Super Synthetic with 20% Castor Oil, which comprises 80% petroleum oil and 20% castor oil. It is believed that the foregoing advantages of castor oil, however, in particular its ability to resist degradation at high temperatures, outweigh any disadvantages (e.g. high viscosity at cold temperatures and tendency to bake on engines at high temperatures), and thus is preferred over conventional petroleum-based oils and synthetic lubricating oils discussed above.

Certain embodiments of the inventive fuel may also contain a small amount of water. The amount of water which may be incorporated in certain fuel compositions, in particular those fuel compositions used for igniting small utility engines, may range from about 0.50 w/w % to about 10 w/w %.

Certain embodiments of the inventive fuel compositions also contain at least one surfactant. A sufficient amount of at least one surfactant is often required when water is added and/or when methanol is used in combination with limonene in order to form a homogenous or clear solution. Also, when more than 10 w/w% of limonene is present in the fuel composition, a surfactant is often required. However, even if the fuel contains less than 10 w/w% limonene (or contains water or methanol), a surfactant is still often desirable since it allows the fuel components to blend better and stay blended, thereby increasing the shelf life of the final fuel product.

The types of surfactants that can be used in the present invention are commonly known to those of ordinary skill in the art who first have the benefit of this invention's teachings and suggestions. Exemplary of suitable surfactants include, but are not limited to, polyethoxyethanol non-ionic surfactants, such as Triton X-100 and Triton X-114 (octylphenoxy polyethoxy-ethanol), and Triton X-110, and the glycol ethers. The most preferred surfactants in particular for the Hobby engines, 2-cycle and 4-cycle motorcycle engines, and similar engines used to power vehicles, are the glycol ethers due to their higher BTU's. The most preferred glycol ether is ethylene glycol monobutyl ether (also known as glycol ether EB) because it has the highest number of BTU's (i.e. 14,032) as compared to other suitable glycol ethers. Exemplary of suitable glycol ethers include, but are not limited to, diethylene glycol monobutyl ether (i.e. glycol ether DB), ethylene glycol monomethyl ether (i.e. glycol ether EM), ethylene glycol monoethyl ether (i.e. glycol ether EE), 2-(2-methoxyethoxy) ethanol (i.e. glycol ether DM), and diethylene glycol monoethyl ether (i.e. glycol ether DE).

The type and concentration of surfactant present depends largely upon the amount of the additional fuel components as well as the type of engine used. The concentration of the Triton surfactants preferably range from about 0.6 w/w % to about 7 w/w %, more preferably from about 0.7 w/w % to about 1.3 w/w %. As discussed above, however, the most preferred surfactants are the glycol ethers, most preferably glycol ether EB, due to its high BTU capacity. The preferred concentration range for glycol ether is from about 3 w/w % to about 36 w/w %.

All of the inventive fuel compositions disclosed herein will ignite engines such as 2-cycle, 4-cycle, and diesel internal combustion engines, for example. Smaller 2-cycle and 4-cycle engines are those commonly found in the small Hobby race car and airplane engines, for example, which typically use nitromethane-based fuels, gasoline, or diesel fuels. The inventive fuel compositions particularly useful in running the Hobby 2-cycle and 4-cycle engines preferably comprise from about 9 w/w % to about 20 w/w % limonene, more preferably about 10 to about 16 w/w %. In general, the smaller Hobby engines, which range in size from 0.10 cc to 0.80 cc, require at least about 2 w/w % of lubricating oil, more preferably about 4 w/w %, and most preferably about 6 w/w % oil. The "smaller" 0.10 cc Hobby engines, however, require at least 4 w/w% oil.

A preferred engine fuel particularly suitable for igniting Hobby engines, both 2-cycle and 4-cycle, comprises from about 10 to about 16 w/w % limonene, from about 19 w/w % to about 45 w/w % aliphatic hydrocarbons, most preferably VM&P Naptha, from about 20 w/w % to about 40 w/w % alcohol, most preferably methanol, from about 9 w/w % to about 36 w/w % surfactant, most preferably glycol ether EB. The most preferred engine fuel for use in all Hobby engines (both small and large Hobby engine sizes) is as follows: about 11.4 w/w % limonene, about 40.7 w/w % VM&P Naptha, about 15.5 w/w % glycol ether EB, about 22 w/w % methanol, and about 10.6 w/w % castor oil (i.e. Formulation F as shown in Examples 1 and 3).

The inventive fuel is also useful for igniting larger 2-cycle and four cycle engines present in some motorcycles and snow mobiles, for example. Like the smaller Hobby engines, these engines require fuels having higher BTU's. While all of the inventive fuel compositions described herein may be employed, a particularly preferred fuel composition suitable for powering a 2-cycle and 4-cycle motorcycle engine or similar vehicle engine comprises from about 20 to 21 w/w % limonene, from 62 w/w % to about 64 w/w % alcohol, most preferably methanol, about 15 to 16 w/w % surfactant, more preferably glycol ether EB, and optionally about 2 w/w % lubricating oil, more preferably castor oil, as shown in Example 4 (Formulations G and H). Another suitable fuel formulation for use in these types of larger 2-cycle engines comprises from about 11 w/w % limonene, about 85 w/w % VM&P Naptha, and about 3.75 w/w % oil (i.e. Formulation I in Example 4).

Larger 2-cycle engines, also known as small utility engines, are commonly found in lawn and garden equipment such as weedeaters, edgers, lawnmowers, chain saws, grass blowers, and the like. Some lawn and garden equipment employ 4-cycle engines, as well. Since these engines do not need as many BTU's to run effectively as do "vehicle" engines, including the smaller Hobby engines, motorcycle engines, and snowmobile engines, for example, less limonene may be used (limonene contains about 18,221 BTU's). Nevertheless, the foregoing preferred fuel compositions discussed above for use in engines requiring high BTU's can also be used to ignite these small utility engines. Also, preferred fuel compositions are selected based upon the amount of emissions they produce when ignited. Embodiments of the present inventive fuels particularly useful in running these larger 2-cycle engines for lawn and garden equipment preferably comprise from about 10 to about 20% limonene. The more preferred inventive fuel compositions for igniting small utility engines should also include a sufficient amount of at least one lubricating oil, preferably from about 0.50 w/w % to about 8 w/w %, more preferably from about 0.64 w/w % to about 7.5 w/w % when 10 w/w % or less of limonene is present in the fuel. A preferred fuel composition exhibiting particularly good results in these small utility engines comprises about 11 w/w % limonene, from about 82 w/w % to about 88 w/w % aliphatic hydrocarbon, most preferably VM&P Naptha, and from about 0.50 w/w % to about 7.4 w/w % lubricating oil, most preferably castor oil (Formulations J and K shown in Example 5). Another fuel composition suitable for igniting these type of small utility engines comprises about 19 w/w % limonene, about 38 w/w % methanol, about 10 w/w % water, and about 34 w/w % glycol ether (Formulation L in Example 5).

As discussed above, all of the inventive fuel compositions may also be used as fuel additives for conventional petroleum-based engine fuels, preferably gasoline having an octane number of at least 87, nitromethane-based fuels, and alcohol-based fuels used in both two-cycle and four-cycle engines. A preferred fuel additive formulation comprises from about 5 to about 20 w/w % limonene, more preferably about 13 w/w %; from about 30 to about 90 w/w % aliphatic petroleum distillate, more preferably about 77 w/w % VM&P Naptha; from about 1 to about 12 w/w %, most preferably about 7 w/w %, surfactant, most preferably glycol ether EB, and from about 1 to about 7 w/w %, more preferably about 2.5 w/w % lubricating oil, most preferably castor oil (See Formulation M in Example 6.). In the most preferred embodiment (Formulation N in Example 6), the additive comprises from about 10 to about 20 w/w % limonene, more preferably about 13 w/w %, and from about 80 to about 90 w/w % alcohol, more preferably about 87 w/w % methanol. The foregoing inventive fuel additive formulations are particularly useful in improving engine response as well as decreasing the amount of carbon deposits on the engine, in particular the spark plugs, piston tops, and piston rings.

It is necessary that the engine fuel lines and "O" rings be formed of materials that are resistant to degradation by the various components present in the inventive fuels. Rubber, which is a commonly used material, is not a suitable material since it is especially susceptible to degradation by the inventive fuels. Teflon is a suitable engine line material in that it is sufficiently resistant to the inventive fuels, although other materials, such as those listed below for "O" rings, may also be used. Examples of suitable "O" ring materials which are sufficiently resistant to degradation by the inventive fuels include, but are not limited to, fluorinated ethylene propylene (Teflon FEP), polytetrafluoroethylene (Teflon PTFE), perfluoroalkoxy (Teflon PFA), ethylenechlorotrifluoro-ethylene (Halar ECTFE), ethylene-tetrafluoroethylene (Tetzel ETFE), polyvinylidene fluoride (PVDF), and Viton™ (a fluor elastomer). Viton™, manufactured by dupont, is the most preferred material since, like rubber, it is more flexible than Teflon.

As an alternative to nitromethane-based fuels, the inventive fuels perform better than the nitromethane fuels, are more efficient (i.e. less fuel is required to run the engine), and are cleaner (i.e. the inventive fuels leave about 85% less liquid exhaust residue).

No special equipment is required to formulate the inventive fuel compositions, and all mixing may be performed under ambient conditions. However, depending upon which components are used in a particular fuel formulation, the order of mixing may be important. In all cases, it is preferable to add slowly the various components to the terpene. If methanol and/or an aliphatic petroleum distillate, in particular VM&P Naptha, are to be added, the methanol is added, with stirring, followed by VM&P Naptha, or vice versa. Next, if a surfactant is to be used, it should preferably be added to the terpene or terpene/methanol and/or VM&P Naptha mixture, with stirring for approximately two to about five minutes until blended (i.e. the mixture is clear). Finally, the lubricating oil is added last, if desired, with stirring until blended. If water is to be added to the fuel composition, it should be added slowly prior to the addition of the surfactant.

The following examples are not intended to limit the scope of the invention, but are intended to illustrate the various aspects of the invention.

EXAMPLE 1

The following preferred Hobby engine fuel compositions (Formulations A–F) were prepared as follows:

Formulation A: 22.5 ml of methanol was added to about 11 ml of d-limonene (technical grade—manufactured by Florida Chemical Company, Inc.), with stirring. Next, about 44.5 ml of VM&P Naptha was added to the limonene/methanol mixture. About 14 ml of glycol ether EB was added to the limonene/methanol/VM&P Naphtha, with stirring, until the mixture cleared (approximately 2 to 5 minutes). Finally, about 10 ml of castor oil was added to the mixture until blended.

Formulations B–F were prepared as described above for Formulation A, except using different amounts of each component, as shown below.

Formulation B: Limonene: 10 ml; methanol: 23 ml; VM&P Naphtha: 20 ml; glycol ether EB: 31 ml; and castor oil: 8 ml.

Formulation C: Limonene: 15 ml; methanol: 25 ml; VM&P Naphtha: 40 ml; glycol ether EB: 14 ml; and castor oil: 6 ml.

Formulation D: Limonene: 11 ml; methanol: 38 ml; VM&P Naphtha: 40 ml; glycol ether EB: 9 ml; and castor oil: 5 ml.

Formulation E: Limonene: 11 ml; methanol: 30 ml; VM&P Naphtha: 32 ml; glycol ether EB: 20 ml; and castor oil: 9 ml.

Formulation F: Limonene: 11 ml; methanol: 22.5 ml; VM&P Naphtha: 44.5 ml; glycol ether EB: 14 ml; and castor oil: 9 ml.

EXAMPLE 2

Comparison between 15% nitromethane/methanol and Hobby fuel Formulation D in a 2-cycle engine:

A study was conducted in a two-cycle Hobby engine (3000 Super Tiger, manufactured by SATO) comparing about 103 ml of Formulation D as described in Example 1 above to a nitromethane/methanol fuel manufactured by OMEGA (OMEGA Competition Fuel) comprising 15% nitromethane, 85% methanol, and 18% Klotz's synthetic lubricating oil. A total of 100 ml of the nitromethane fuel was added to the engine tank.

The engine was allowed to run using each of the foregoing fuels until no fuel remained in the engine (i.e. about 13 minutes for the nitromethane fuel and about 24 minutes for Formulation D). Upon completion of each run, the following results were obtained:

Formulation D:

Engine head temperature at 10,000 rpm: 30° C.

Maximum RPM's: 13,400

Idel RPM's: 2,500

Maximum head temperature after engine shut-off: 50° C.

15% nitromethane/85% methanol fuel:

Engine head temperature at 10,000 rpm: 30° C.

Maximum RPM's: 13,100

Idel RPM's: 2,500

Maximum head temperature after engine shut-off: 49° C.

EXAMPLE 3

Comparison between 10% nitromethane/methanol and Hobby engine fuel Formulation F in a 2-cycle engine:

A study was conducted in a two-cycle Hobby engine (0.40 cc Webra) comparing Formulation F described in Example 1 to a nitromethane/methanol fuel manufactured by OMEGA (OMEGA Competition Fuel) comprising 10% nitromethane, 90% methanol, and 18% Klotz's synthetic lubricating oil. The engine was allowed to run using each of the foregoing fuels until no fuel remained in the engine (i.e. about 13 minutes for the nitromethane fuel and about 24 minutes for Formulation F). Upon completion of each run, the following results were obtained:

Formulation F:

Engine head temperature at 10,000 rpm: 29.5° C.

Maximum RPM's: 13,100

Idel RPM's: 2,300

Maximum head temperature after engine shut-off: 60° C.

10% nitromethane/90% methanol fuel:

Engine head temperature at 10,000 rpm: 29° C.

Maximum RPM's: 13,100

Idel RPM's: 2,300

Maximum head temperature after engine shut-off: 54.5° C.

EXAMPLE 4

The following preferred motorcycle engine fuel compositions (Formulations G–I) were prepared as follows:

Formulation G: About 66 ml of methanol was added to about 20 ml of d-limonene (technical grade), with stirring. Next, about 14 ml of glycol ether EB was added, with stirring, to the limonene/methanol mixture until blended (i.e. the mixture cleared).

Formulation H: About 65 ml of methanol was added to about 20 ml of d-limonene (technical grade), with stirring. Next, about 14 ml of Glycol ether EB was added, with stirring, to the limonene/methanol mixture until blended. Finally, about 2 ml of castor oil was added to the mixture, with stirring, until blended.

Formulation I: About 88 ml of VM&P Naphtha was added to about 10 ml of d-limonene (technical grade), with stirring. Next, 3 ml of castor oil was added to the mixture, with stirring, until blended (i.e. the mixture cleared).

EXAMPLE 5

The following formulations preferred for operating small utility engines typically found in garden and lawn equipment were prepared as follows:

Formulation J: About 89.5 ml of VM&P Naphtha was added to about 10 ml of d-limonene (technical grade), with stirring. Next, about 0.50 ml of castor oil was added to the limonene/VM&P Naphtha mixture, with stirring, until blended (i.e. the mixture cleared).

Formulation K: About 85 ml of VM&P Naphtha was added to about 10 ml of d-limonene (technical grade), with stirring. Next, about 6 ml of castor oil was added to the limonene/VM&P Naphtha mixture, with stirring, until blended (i.e. the mixture cleared).

Formulation L: About 40.6 ml of methanol was added to about 19.5 ml of d-limonene, with stirring, followed by about 8.13 ml of water. Finally, about 31.7 ml of glycol ether EB was added to the limonene/methanol/water mixture, with stirring, until the entire mixture was blended (i.e. the mixture cleared).

EXAMPLE 6

100 ml of the following fuel additive formulations were prepared:

Formulation M: About 80 ml of VM&P Naphtha was added to about 12 ml of d-limonene, with stirring. Next, about 6 ml of glycol ether EB was added to the d-limonene/VM&P Naphtha mixture, with stirring. Finally, about 2 ml of castor oil was added, with stirring, until the entire mixture was blended (i.e. the mixture cleared).

Formulation N: About 88 ml of methanol was added to about 12 ml of d-limonene, with stirring.

EXAMPLE 7

A study was conducted comparing the effects on engine performance using the following fuels: (I) 100 ml of 87 octane gasoline without any additives; (II) 99.5 ml of 87 octane gasoline/0.50 ml of 104 OCTANE BOOST fuel additive (a competitor fuel additive product); (III) 99.5 ml of 87 octane gasoline/0.50 ml of Formulation M (described in Example 6); and (IV) 99.5 ml of 87 octane gasoline/0.50 ml of Formulation N (described in Example 6).

The engine used in the study was a 3 horsepower Briggs & Straton 4-cycle engine. In all test runs, the engine ran at a fast idel (about 800 RPM's). The following parameters were studied during each run: engine head temperature (i.e. engine temperature while running); cool down temperature (i.e. engine temperature upon completion of the run); throttle response (0=engine off; 10=maximum response); and amount of carbon deposits observed on the spark plug. A new spark plug (Champion 861-J19LM) was used for each test run. The results of the study are illustrated in Table 1 below.

TABLE 1

| Fuel Comp. | Head temp. (C. °) | Cool down (C. °) | Response (0–10) |
|---|---|---|---|
| I | 59.5 | 70 | 6/7 |
| II | 60.5 | 72.5 | 7/8 |
| III | 61 | 69.5 | 8/9 |
| IV | 61.5 | 69 | 8/9 |

Upon completion of the run using Fuel Composition I (gasoline only), there were heavy carbon deposits observed on the spark plug. Upon completion of the run using Fuel Composition II (gasoline/104 OCTANE BOOST), the carbon deposits found on the plug were reduced about 20–25% (upon visual inspection) when compared to Fuel Composition I. Upon completion of the run using Fuel Composition III (gasoline/Formulation L), the carbon deposits found on the plug were reduced about 50% (upon visual inspection) when compared to Fuel Composition I. Finally, upon completion of the run using Fuel Composition IV, the carbon deposits found on the plug were reduced even more, upon visual inspection, when compared to Fuel Composition III.

I claim:

1. A method for igniting an engine comprising the steps of (a) adding a fuel to said engine, said fuel comprising a terpene and a naphtha compound; and (b) igniting said engine.

2. The method of claim 1, wherein said engine is a 2-cycle internal combustion engine.

3. The method of claim 2, wherein said engine is a 4-cycle internal combustion engine.

4. The method of claim 1, wherein said fuel further comprises a lubricating oil.

5. The method of claim 1, wherein said fuel comprises from about 10 to about 42% terpene and from about 1% to about 90% naphtha compound.

6. The method of claim 1, wherein said naphtha compound has a flash point of from about 45° F. to about 75° F.

7. The method of claim 6, wherein said naphtha compound is VM&P Naphtha.

8. The method of claim 5, wherein said fuel comprises from about 10 to about 20% terpene and from about 80 to about 90% naphtha compound.

9. The method of claim 5, wherein said naphtha compound has a flash point of from about 45° F. to about 75° F.

10. The method of claim 9, wherein said naphtha compound is VM&P Naphtha.

11. The method of claim 8, wherein said naphtha compound has a flash point ranging from about 45° F. to about 75° F.

12. The method of claim 11, wherein said naphtha compound is VM&P Naphtha.

13. The method of claim 2, wherein said engine is a 2-cycle small utility engine suitable for use in lawn and garden equipment.

14. The method of claim 13, wherein said naphtha compound has a flash point ranging from about 45° F. to about 75° F.

15. The method of claim 13, wherein said engine is a 4-cycle small utility engine suitable for use in lawn and garden equipment.

16. The method of claim 15, wherein said naphtha compound has a flash point ranging from about 45° F. to about 75° F.

17. A method for igniting an engine comprising the steps of (a) adding a fuel composition to said engine, said fuel composition comprising a fuel additive and an engine fuel; and (b) igniting said engine;

and wherein said fuel additive further comprises a terpene and a naphtha compound.

18. The method of claim 17, wherein said fuel additive includes a lubricating oil.

19. The method of claim 17, wherein said engine is a 2-cycle internal combustion engine.

20. The method of claim 17, wherein said engine is a 4-cycle internal combustion engine.

21. The method of claim 17, wherein said fuel additive includes from about 10 to about 42% terpene and from about 1 to about 90% naphtha compound.

22. The method of claim 21, wherein said fuel additive includes from about 10 to about 20% terpene and from about 80 to about 90% naphtha compound.

23. The method of claim 21, wherein said naphtha compound had a flash point of from about 45° F. to about 75° F.

24. The method of claim 23, wherein said naphtha compound is VM&P Naphtha.

25. The method of claim 17, wherein said engine fuel is a petroleum-based fuel.

26. The method of claim 17, wherein said engine fuel is a nitromethane-based fuel.

27. The method of claim 17, wherein said engine fuel is an alcohol-based fuel.

28. The method of claim 17, wherein said naphtha compound had a flash point of from about 45° F. to about 75° F.

29. The method of claim 28, wherein said fuel additive comprises from about 10 to about 42% of said terpene and from about 1 to about 90% of said naptha compound.

30. The method of claim 29, wherein said fuel additive comprises from about 10 to about 20% of said terpene and from about 80 to about 90% of said naptha compound.

31. The method of claim 28, wherein said naphtha compound is VM&P Naphtha.

32. The method of claim 31, wherein said fuel additive comprises from about 10 to about 42% of said terpene and from about 1 to about 90% of said naptha compound.

33. The method of claim 32, wherein said fuel additive comprises from about 10 to about 20% of said terpene and said from about 80 to about 90% of said naptha compound.

*34. A method for igniting an engine comprising:*

*(a) adding a fuel to said engine, said fuel comprising limonene and a naphtha compound; and (b) igniting said engine.*

*35. The method of claim 34, wherein said fuel further includes a lubricating oil.*

*36. The method of claim 34, wherein said fuel comprises from about 10 to about 42% limonene and from about 1% to about 90% naphtha compound.*

*37. The method of claim 34, wherein said naphtha compound has a flash point of from about 45° F. to about 75° F.*

*38. The method of claim 37, wherein said naphtha compound is VM&P naphtha.*

*39. The method of claim 36, wherein said fuel comprises from about 10% to 20% limonene and from about 80% to 90% naphtha compound.*

*40. The method of claim 36, wherein said naphtha compound has a flash point of from about 45° F. to about 75° F.*

*41. The method of claim 40, wherein said naphtha compound is VM&P naphtha.*

*42. A method for igniting an engine comprising:*

*(a) adding a fuel composition to said engine, said fuel composition comprising a fuel additive and an engine fuel; and (b) igniting said engine;*

*and wherein said fuel additive comprises limonene and a naphtha compound.*

*43. The method of claim 42, wherein said fuel additive further includes a lubricating oil.*

*44. The method of claim 42, wherein said fuel additive comprises from about 10 to about 42% limonene and from about 1% to about 90% naphtha compound.*

*45. The method of claim 42, wherein said naphtha compound has a flash point of from about 45° F. to about 75° F.*

*46. The method of claim 45, wherein said naphtha compound is VM&P naphtha.*

*47. The method of claim 44, wherein said fuel additive comprises from about 10% to 20% limonene and from about 80% to 90% naphtha compound.*

*48. The method of claim 44, wherein said naphtha compound has a flash point of from about 45° F. to about 75° F.*

*49. The method of claim 48, wherein said naphtha compound is VM&P naphtha.*

*50. The method of claim 47, wherein said naphtha compound is VM&P naphtha.*

* * * * *